(12) United States Patent
Bosek et al.

(10) Patent No.: US 12,538,893 B2
(45) Date of Patent: Feb. 3, 2026

(54) MILKING ARRANGEMENT COMPRISING A CLEANING ARRANGEMENT

(71) Applicant: DELAVAL HOLDING AB, Tumba (SE)

(72) Inventors: Lukasz Bosek, Tumba (SE); Krystian Stencel, Tumba (SE); Tomasz Stremecki, Tumba (SE)

(73) Assignee: DeLaval Holding AB, Tumba (SE)

( * ) Notice: Subject to any disclaimer, the term of this patent is extended or adjusted under 35 U.S.C. 154(b) by 603 days.

(21) Appl. No.: 17/924,984

(22) PCT Filed: May 11, 2021

(86) PCT No.: PCT/SE2021/050452
§ 371 (c)(1),
(2) Date: Nov. 11, 2022

(87) PCT Pub. No.: WO2021/230801
PCT Pub. Date: Nov. 18, 2021

(65) Prior Publication Data
US 2023/0180708 A1      Jun. 15, 2023

(30) Foreign Application Priority Data

May 13, 2020   (SE) .................................. 2050561-6

(51) Int. Cl.
*A01J 7/02*          (2006.01)
(52) U.S. Cl.
CPC ..................................... *A01J 7/022* (2013.01)
(58) Field of Classification Search
CPC ...................................................... A01J 7/022
See application file for complete search history.

(56) References Cited

U.S. PATENT DOCUMENTS

| 5,052,341 A | 10/1991 | Woolford et al. |
| 5,896,828 A | 4/1999 | Kronschnabel |

(Continued)

FOREIGN PATENT DOCUMENTS

| CN | 106441766 A | 2/2017 |
| CN | 108347896 A | 7/2018 |

(Continued)

OTHER PUBLICATIONS

Search Report for SE Application No. 2050561-6 dated Dec. 18, 2020, 2 pages.

(Continued)

*Primary Examiner* — Spencer E. Bell
(74) *Attorney, Agent, or Firm* — NIXON & VANDERHYE

(57) ABSTRACT

A milking arrangement with a milk transport line and a plurality of milk stations connected thereto, with a receiver that receives milk transported from the milk stations via the transport line, a vacuum system that supplies a vacuum in the transport line via the receiver, a cleaning liquid source connected to the transport line, and a controllable injector that introduces gas into the milk transport line that to cause a slug of cleaning liquid from the cleaning liquid source to be formed and forwarded through the transport line, a vibration sensor being arranged on the receiver and configured to measure a motion of the receiver caused by the slug entering the receiver, and a control system configured to control the operation of the injector and to determine an entering of the slug into the receiver based on the measurement of the vibration sensor.

13 Claims, 1 Drawing Sheet

(56) References Cited

U.S. PATENT DOCUMENTS

| | | | |
|---|---|---|---|
| 6,089,242 A | 7/2000 | Buck | |
| 2008/0163700 A1 | 7/2008 | Huang | |
| 2011/0041770 A1 | 2/2011 | Westman | |
| 2015/0218919 A1* | 8/2015 | Beg | B04C 9/00 137/154 |
| 2016/0223376 A1 | 8/2016 | Daly et al. | |
| 2018/0352779 A1 | 12/2018 | Enickl | |

FOREIGN PATENT DOCUMENTS

| | | |
|---|---|---|
| JP | S6264271 U | 4/1987 |
| JP | 2018534918 A | 11/2018 |
| JP | 2020046206 A | 3/2020 |
| WO | 2009/029041 | 3/2009 |
| WO | 2013/070062 | 5/2013 |
| WO | 2017/091126 | 6/2017 |

OTHER PUBLICATIONS

International Search Report for PCT/SE2021/050452 dated Aug. 31, 2021, 2 pages.
Written Opinion of the ISA for PCT/SE2021/050452 dated Aug. 31, 2021, 6 pages.
Office Action, issued in Chinese Patent Application No. 202180030805.9 dated Nov. 21, 2024.
Office Action, issued in Japanese Patent Application No. 2022-562814 dated May 30, 2025.

\* cited by examiner

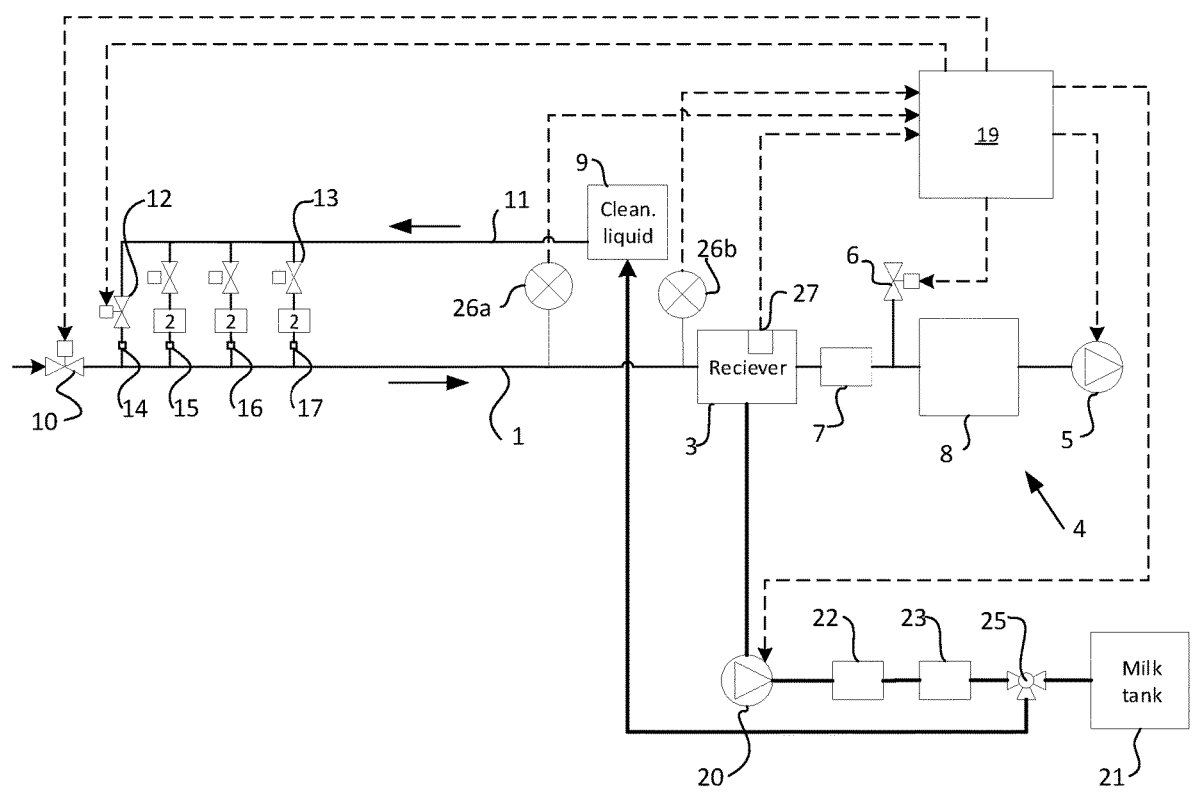

MILKING ARRANGEMENT COMPRISING A CLEANING ARRANGEMENT

CROSS-REFERENCE TO RELATED APPLICATIONS

This application is the U.S. national phase of International Application No. PCT/SE2021/050452 filed May 11, 2021 which designated the U.S. and claims priority to SE 2050561-6 filed May 13, 2020, the entire contents of each of which are hereby incorporated by reference.

TECHNICAL FIELD

The present invention relates to a milking arrangement comprising: a milk transport line, a plurality of milk stations connected to the milk transport line, a receiver connected to the milk transport line and configured to receive milk transported from the milk stations to the receiver via the milk transport line, and a vacuum system configured to supply a vacuum in the milk transport line via the receiver, a cleaning liquid source connected to the milk transport line, a controllable injector configured to introduce an amount of gas into the milk transport line thus producing a temporary pressure increase therein which causes a slug of a cleaning liquid from the cleaning liquid source to be formed an forwarded through the milk transport line, and a control system configured to control the operation of the injector.

BACKGROUND

Milking arrangements comprise a cleaning arrangement provided for the purpose of repeatedly cleaning the milk stations, the milk transport line and components such as filters and heat exchangers provided along the milk transport line. The cleaning comprises different sequences such as pre-rinsing and main cleaning.

Milking arrangements equipped with a vacuum system for supplying a system vacuum are well known. The vacuum system may be arranged to supply vacuum to the milk transport and to the cleaning liquid transport. The cleaning system may be equipped with a controllable injector configured to introduce an amount of gas, normally atmospheric air, into the milk transport line thus producing a temporary pressure increase therein which causes a slug of a cleaning liquid from a cleaning liquid source to be formed an forwarded through the milk transport line. A slug is a column of liquid filling the cross-section of the milk transport line while traveling at high speed through the latter, driven by the vacuum. The slug has a short length compared to the length of the milk transport line. The slugs end up in a so called receiver, which is supplied with vacuum by the vacuum system. The receiver may be connected to a pump by means of which the liquid in the receiver is pumped back to the cleaning liquid source, for the generation of further slugs.

However, during operation of the milk arrangement, the conditions in the milk transport line, which affect the characteristics of a slug, may change. The conditions may be the amount of liquid present in the milk transport line and/or the vacuum level in the milk transport line. Due to the conditions prevailing in the milk transport line, a slug may lose or gain liquid during its travel such that it may be excessively long or too short at the very end of the milk transport line, as it enters the receiver. The slug may even be eliminated before reaching the receiver. In particular if the slug becomes too short or is eliminated, this will be detrimental to its cleaning effect.

The Object of the Invention

It is an object of the present invention to present a milking arrangement which is at least able of registering an expected entrance of a slug into the receiver, or the absence of an expected entrance.

SUMMARY

The object of the invention is achieved by means of a milking arrangement comprising:
  a milk transport line,
  a plurality of milk stations connected to the milk transport line,
  a receiver connected to the milk transport line and configured to receive milk transported from the milk stations to the receiver via the milk transport line,
  a vacuum system configured to supply a vacuum in the milk transport line,
  cleaning liquid source connected to the milk transport line,
  a controllable injector configured to introduce an amount of gas into the milk transport line thus producing a temporary pressure increase therein which causes a slug of a cleaning liquid from the cleaning source to be formed and forwarded through the milk transport line, and
  a control system configured to control the injector, wherein the milking arrangement being characterized in that it comprises a vibration sensor arranged on the receiver and configured to measure a motion of the receiver caused by a slug entering the receiver, and that the control system is configured to determine an entering of a slug into the receiver on basis of the measurement of the vibration sensor.

The vibration sensor is arranged on the receiver and the vibration sensor may be directly arranged on the receiver or indirectly arranged on the receiver via a component directly attached to the receiver.

If the vibration sensor is arranged indirectly to the receiver it is configured to measure vibrations that are representative of vibrations caused by a slug entering the receiver.

The vibration sensor may be a piezoelectric sensor, ultrasonic sensor or an accelerometer.

The inventors have realized that, due to the energy of motion of a slug, it will generate a motion of the receiver as it enters the latter. A registering of such a motion may therefore be an advantageous way of identifying an entrance of a slug.

According to one embodiment, the vibration sensor is an accelerometer, preferably a three-directional accelerometer. An accelerometer has the advantage of being reliable. Thereby, an improved measurement of motions of the receiver is achieved.

According to one embodiment, the vibration sensor is arranged on an outside of the receiver. Thereby, the vibration sensor is out of contact with the milk or fluid inside the receiver, resulting in less wear and negative effect on its functionality.

According to one embodiment, the control system is configured to determine a characteristic of a slug on basis of the measurement of the vibration sensor.

According to one embodiment, the control system comprises a readable memory, in which there is stored a look-up table with set values, each value representing a value of a slug characteristic, wherein the control system is configured to compare the measurement of the vibration sensor with the set values in the look-up table and to determine that the slug characteristic of a slug corresponds to the preset value closest to the value measured by the vibration sensor. On basis of the knowledge of the slug characteristic, measures may be taken to control the milking arrangement, preferably to control the controllable injector and/or the vacuum system, for the purpose of achieving a requested slug characteristic of a subsequent slug.

According to one embodiment, the slug characteristic comprises the length of the slug and/or the velocity of the slug.

According to one embodiment, the control system is configured to regulate the vacuum level supplied by the vacuum system and/or the amount of gas introduced via the controllable injector on basis of the measurement of the vibration sensor. Thereby, the characteristic of a slug is controlled on basis of the measurements performed by the vibration sensor on one or more previous slugs.

According to one embodiment, the milking arrangement comprises a sensor arrangement arranged along the milk transport line, wherein the sensor arrangement comprises any one of a pressure sensor, an ultra sound sensor or an electromagnetic sensor, wherein the control system is configured to determine the slug characteristics on basis of a measurement of said sensor arrangement. Preferably, the sensor arrangement is arranged in the vicinity of, preferably within 10 meters from the receiver. Thereby, information regarding slug velocity or slug length close to the receiver may be used by the processor as a supplement to the measurement of the accelerometer for the purpose of determining the slug characteristics of a slug entering the receiver.

The sensor arrangement may comprise a pair of pressure sensors positioned at separate positions along the milk transport line. The passage of a slug results in a change of pressure measurable by the respective sensor. On basis of a known distance between the pressure sensors and the point of time at which the passage of a slug is detected by the respective sensor, the control system is configured to determine the velocity of the slug. The length of the slug may also be determined on basis of the measurements of the pressure sensors. The measurements and determination of the slug characteristics by means of the sensor arrangement may be used as supplement to the measurement and determination of the slug characteristics by means of the vibration sensor.

Further features and advantages of the present invention will be presented in the following detailed description.

BRIEF DESCRIPTION OF THE DRAWING

FIG. 1 is a schematic representation of a milking arrangement according to the present invention.

DETAILED DESCRIPTION OF EMBODIMENTS

FIG. 1 shows a milking arrangement according to an embodiment of the invention. The milking arrangement comprises a milk transport line 1 and a plurality of milk stations 2 connected to the milk transport line 1. Each milk station 2 comprises milking equipment for the milking of an animal. The milk transport line 1 has a length of 100 meters or more.

The milking arrangement further comprises a receiver 3 connected to the milk transport line 1 and configured to receive milk transported from the milk stations 2 to the receiver 3 via the milk transport line 1.

There is also provided a vacuum system 4 configured to supply a vacuum in the milk transport line 1 via the receiver 3. The vacuum system 4 comprises a vacuum pump 5 and a controllable valve 6 configured to introduce gas, preferably atmospheric air, into a line that connects the receiver 3 with the vacuum pump 5. The vacuum supplied by the vacuum system may be controlled by controlling the effect of the vacuum pump 5 and/or the opening and closure of the controllable valve 6. The vacuum system 4 also comprises a sanitary trap 7 and a buffer tank 8, arranged in series, via which the vacuum pump 5 is connected to the receiver 3. The vacuum system 4 is used for supplying a vacuum to the milk transport line during milking. However, as will be described later, the vacuum system 4 will also be used for controlling a cleaning sequence.

A cleaning liquid source 9 is connected to the milk transport line 1. The cleaning liquid source 9 may comprise one or more containers in which cleaning liquid is contained, preferably cleaning liquid of different character, typically with different chemical composition and/or different temperature, for different cleaning sequences.

There is also provided a controllable injector 10 configured to introduce an amount of gas, preferably atmospheric air, into the milk transport line 1 thus producing a temporary pressure increase therein which causes a slug of a cleaning liquid from the cleaning liquid source 9 to be formed and forwarded through the milk transport line 1. The liquid source 9 is connected to the milk transport line in the vicinity of the injector 10 via tubing 11 and a controllable valve 12. The equipment of the milking stations 2 are also connectable in a way known per se to the liquid source 9 via the tubing 11 and controllable valves 13. Flow meters 14, 15, 16, 17 in connection to the injector 10 and in connection to the milk stations 2 are provided for measuring the flow of cleaning liquid that enters and occupies at least part of the milk transport line 1.

There is provided a pump 20 via which cleaning liquid is pumped from the receiver 3 to the cleaning liquid source 16. In the specific embodiment shown, the pump 20 is also configured to pump milk from the receiver to a milk tank 21 during milking. In the embodiment shown, the cleaning liquid pumped by said pump 20 is pumped to the liquid source 9 via a filter 22 and a heat exchanger 23 arranged between the pump 20 and the milk tank 21. A controllable valve 25 is provided for the purpose of directing the pumped cleaning liquid towards the cleaning liquid source 9 instead of towards the milk tank 21. During cleaning, said controllable valve 25 prevents flow of cleaning liquid into the milk tank 21.

The milking arrangement further comprises a control system 19 configured to control the operation of the injector 10, the vacuum pump 5 and the controllable valve 6 of the vacuum system 4. The control system 19 is configured to control the vacuum level supplied by the vacuum system 4 by controlling at least one of the vacuum pump 5 and the controllable valve 6. The control system is thereby configured to control the rpm of the vacuum pump 5 and the opening time of the controllable valve 6. A pressure sensor (not shown) may be provided in a line connecting the vacuum pump 5 with the receiver 3, and the control system 19 may be configured to control the vacuum system 4 on basis of input from said pressure sensor. The control system 19 is also configured to control slug characteristics by controlling the amount of gas per time unit introduced via the controllable injector 10. The controllable injector 10 presents a channel that has a controllable variable cross section, and the control system 19 is configured to control said variable cross section of the channel for controlling the amount of gas per time unit introduced via the controllable injector 10. The slug characteristics controlled by the control system 19 thereby comprises the slug velocity of an individual slug and the length of an individual slug.

The control system 19 is also configured to control the operation of the controllable valves 12, 13 via which the cleaning liquid from the cleaning liquid source 9 is allowed to enter the milk transport line 1 either via the injector 10 or via the milking equipment of the milk stations 2. The control system 19 is also configured to control the operation of the pump 20 via which cleaning liquid is pumped from the receiver 3 to the cleaning liquid source 9.

The control system 19 is here exemplified by a control unit which comprises a processor and a readable memory. Alternative embodiments, such as cloud-based solutions are of course also conceivable.

The control system 19 comprises a first control mode dedicated to a first cleaning sequence and a second control mode dedicated to a second cleaning sequence. In the first control mode the characteristics of the generated slug differ from the characteristics of the slug generated in the second control mode.

In the presented embodiment the first control mode uses a first cleaning liquid and the second control mode uses a second cleaning liquid.

The first cleaning sequence is a pre-rinsing sequence and the second cleaning sequence is a main cleaning sequence. The slug generated by the first control mode has a higher average velocity through the milk transport line 1 than the average velocity of the slug generated by the second control mode. The slug generated by the second control mode has a longer average length than the average length of the slug generated by the first control mode. The vacuum level supplied by the vacuum system 4 is higher in the first control mode than in the second control mode. A higher vacuum level is referred to as a lower pressure level.

An indicator of the slug characteristics as the slug enters the receiver 3 is measured by means of a 3D-accelerometer 27 provided on the outside of the receiver 3. The slug will generate a motion of the receiver which corresponds to the speed and length (mass) of the slug. This motion is registered by the accelerometer 27. The control system 19 comprises a readable memory, in which there is stored a look-up table with set values, each value representing a value of a slug characteristic. The control system is configured to compare the measurement of the accelerometer 27 with the set values in the look-up table and to determine that the slug characteristic, velocity and/or length, of a slug corresponds to the preset value closest to the value measured by the accelerometer. The correlation between the set values and the slug characteristics may have been determined in laboratory environment for a predetermined combination of receiver design, accelerometer design and accelerometer position on the receiver. On basis of the knowledge of the slug characteristic, measures may be taken to control the milking arrangement, preferably to control the controllable injector and/or the vacuum system, for the purpose of achieving a requested slug characteristic for a subsequent slug. The control system may thereby be configured to execute an iterative process, typically a closed-loop process, in order to attain slug characteristics that correspond to slug characteristics requested for each respective cleaning sequence.

In the embodiment shown, the milking arrangement also comprises a sensor arrangement, which comprises a first pressure sensor 26a arranged in the milk transport line at a first position and a second pressure sensor 26b arranged at a second position at predetermined distance from the first position. The passage of a slug results in a change of pressure measurable by the respective sensor 26a, 26b. On basis of a known distance between the pressure sensors 26a, 26b and the point of time at which the passage of a slug is detected by the respective sensor, the control system 19 is configured to determine the velocity of the slug. The length of the slug may also be determined on basis of the measurements of the pressure sensors 26a, 26b, for example as described in WO2017/091126. Preferably, the pressure sensors 26a, 26b are arranged in the vicinity of, preferably within 10 meters from the receiver 3.

The pressure sensors 26a, 26b will give information about the slug characteristics at a predetermined location in the milk transport line 1, while the accelerometer 27 gives information about the slug characteristics in the receiver 3. The control system 19 may be configured to combine the information in any suitable way in order to control the injector 10 or the vacuum system 4.

The control system 19 is also configured to control the vacuum level supplied by the vacuum system 4 and/or the amount of gas introduced via the controllable injector 10 on basis of the amount of cleaning liquid determined by the flow meters 14-17.

The invention claimed is:

1. A milking arrangement, comprising:
   a milk transport line (1);
   a plurality of milk stations (2) connected to the milk transport line (1);
   a receiver (3) connected to the milk transport line (1) and configured to receive milk transported from the milk stations (2) to the receiver (3) via the milk transport line (1);
   a vacuum system (4) configured to supply a vacuum in the milk transport line (1);
   a cleaning liquid source (9) connected to the milk transport line (1);
   a controllable injector (10) configured to introduce an amount of gas into the milk transport line (1) that produces a pressure increase in the milk transport line (1) that causes a slug of a cleaning liquid from the cleaning source to be formed and forwarded through the milk transport line (1);
   a control system (19) configured to control the injector (10); and
   a vibration sensor (27) located on the receiver (3) and configured to measure a motion of the receiver (3) caused by the slug entering the receiver (3), wherein the control system (19) is configured to determine a characteristic of a slug comprising a length of the slug and a velocity of the slug on the basis of a measurement of the vibration sensor (27),
   the control system (19) being configured to determine an expected entrance of the slug, or an absence of an expected entrance of the slug, into the receiver based on the measurement of the vibration sensor (27) and the determined characteristic of the slug in the receiver (3).

2. The milking arrangement according to claim 1, wherein the vibration sensor (27) is an accelerometer.

3. The milking arrangement according to claim 1, wherein the vibration sensor (27) is positioned on an outside of the receiver (3).

4. The milking arrangement according to claim 1,
wherein the control system (19) comprises a readable memory that stores a look-up table with set values, each of said set values representing a value of the slug characteristic, and
wherein the control system is further configured to compare the measurement of the vibration sensor (27) with the set values in the look-up table and to determine that the slug characteristic of the slug corresponds to a preset value closest to the value measured by the vibration sensor.

5. The milking arrangement according to claim 1, wherein the control system (19) is further configured to regulate a vacuum level of the vacuum supplied by the vacuum system (4) and/or the amount of gas introduced via the controllable injector (10) based on the measurement of the vibration sensor.

6. The milking arrangement according to claim 1, further comprising:
a sensor arrangement (26a, 26b) arranged along the milk transport line (1),
wherein the sensor arrangement (26a, 26b) comprises any one selected from the group consisting of a pressure sensor, an ultra sound sensor, and an electromagnetic sensor, and
wherein the control system (19) is further configured to determine the slug characteristics based on a measurement of said sensor arrangement (26a, 26b).

7. The milking arrangement according to claim 1, wherein a vacuum pump is connected to the receiver (3) to supply vacuum therein.

8. The milking arrangement according to claim 2, wherein the control system (19) is further configured to regulate a vacuum level of the vacuum supplied by the vacuum system (4) and the amount of gas introduced via the controllable injector (10) based on the measurement of the vibration sensor.

9. The milking arrangement according to claim 3, wherein the control system (19) is further configured to regulate a vacuum level of the vacuum supplied by the vacuum system (4) and the amount of gas introduced via the controllable injector (10) based on the measurement of the vibration sensor.

10. The milking arrangement according to claim 5, wherein the control system (19) is further configured to regulate a vacuum level of the vacuum supplied by the vacuum system (4) and the amount of gas introduced via the controllable injector (10) based on the measurement of the vibration sensor.

11. The milking arrangement according to claim 2, further comprising:
a sensor arrangement (26a, 26b) arranged along the milk transport line (1),
wherein the sensor arrangement (26a, 26b) comprises any one selected from the group consisting of a pressure sensor, an ultra sound sensor, and an electromagnetic sensor, and
wherein the control system (19) is further configured to determine the slug characteristics based on a measurement of said sensor arrangement (26a, 26b).

12. The milking arrangement according to claim 3, further comprising:
a sensor arrangement (26a, 26b) arranged along the milk transport line (1),
wherein the sensor arrangement (26a, 26b) comprises any one selected from the group consisting of a pressure sensor, an ultra sound sensor, and an electromagnetic sensor, and
wherein the control system (19) is further configured to determine the slug characteristics based on a measurement of said sensor arrangement (26a, 26b).

13. The milking arrangement according to claim 5, further comprising:
a sensor arrangement (26a, 26b) arranged along the milk transport line (1),
wherein the sensor arrangement (26a, 26b) comprises any one selected from the group consisting of a pressure sensor, an ultra sound sensor, and an electromagnetic sensor, and
wherein the control system (19) is further configured to determine the slug characteristics based on a measurement of said sensor arrangement (26a, 26b).

* * * * *